(12) United States Patent
Krude et al.

(10) Patent No.: US 8,157,692 B2
(45) Date of Patent: Apr. 17, 2012

(54) DIFFERENTIAL ASSEMBLY WITH BEARING DISCS IN OPENINGS FOR MOUNTING PURPOSES

(75) Inventors: Werner Krude, Neunkirchen-Seelscheid (DE); Ralf Leuschen, Oberbettingen (DE); Michael Engelmann, St. Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 845 days.

(21) Appl. No.: 11/915,559

(22) PCT Filed: Feb. 17, 2006

(86) PCT No.: PCT/EP2006/001460
§ 371 (c)(1),
(2), (4) Date: Sep. 24, 2008

(87) PCT Pub. No.: WO2006/125480
PCT Pub. Date: Nov. 30, 2006

(65) Prior Publication Data
US 2009/0270218 A1    Oct. 29, 2009

(30) Foreign Application Priority Data
May 24, 2005 (DE) .......... 10 2005 024 456

(51) Int. Cl.
*F16H 48/10* (2012.01)
(52) U.S. Cl. ................ 475/230; 475/248
(58) Field of Classification Search ......... 475/230, 475/248
See application file for complete search history.

(56) References Cited

U.S. PATENT DOCUMENTS

| | | | |
|---|---|---|---|
| 2,270,567 A * | 1/1942 | Slider | 475/251 |
| 5,234,388 A * | 8/1993 | Nordkvist | 475/230 |
| 5,647,814 A * | 7/1997 | Krisher | 475/230 |
| 5,951,431 A | 9/1999 | Downs et al. | |
| 5,980,417 A * | 11/1999 | Wopshall, Jr. | 475/230 |
| 7,011,594 B2 | 3/2006 | Krude et al. | |
| 2005/0032601 A1* | 2/2005 | Kashiwazaki | 475/230 |
| 2006/0243092 A1* | 11/2006 | Prichard et al. | 74/607 |

FOREIGN PATENT DOCUMENTS

| | | |
|---|---|---|
| DE | 198 20 206 A1 | 11/1998 |
| DE | 199 37 104 A1 | 2/2000 |
| DE | 101 44 200 A1 | 3/2003 |
| DE | 103 08 800 A1 | 9/2004 |
| GB | 255952 | 7/1926 |
| JP | 4132245 | 12/1992 |
| WO | WO 2005/038306 A | 4/2005 |

OTHER PUBLICATIONS

English translation in part of JP4132245.

* cited by examiner

*Primary Examiner* — David D Le
*Assistant Examiner* — Derek D Knight
(74) *Attorney, Agent, or Firm* — Rader, Fishman & Grauer, PLLC

(57) ABSTRACT

The invention relates to a differential assembly in the form of a crown gear differential, more particularly for being used in the driveline of a motor vehicle. The differential assembly comprises a differential carrier (3) which is produced in one piece, which is rotatingly drivable around an axis of rotation A and which, in a casing portion (26), comprises two radial openings for mounting sideshaft gears (15, 16) and differential gears (14). Per opening (20), there is provided a bearing disc (19) which is inserted into said opening (20) and which comprises a central bore (30) in which there is held a journal end (28) of a bearing journal (27) for a differential gear (14).

18 Claims, 5 Drawing Sheets

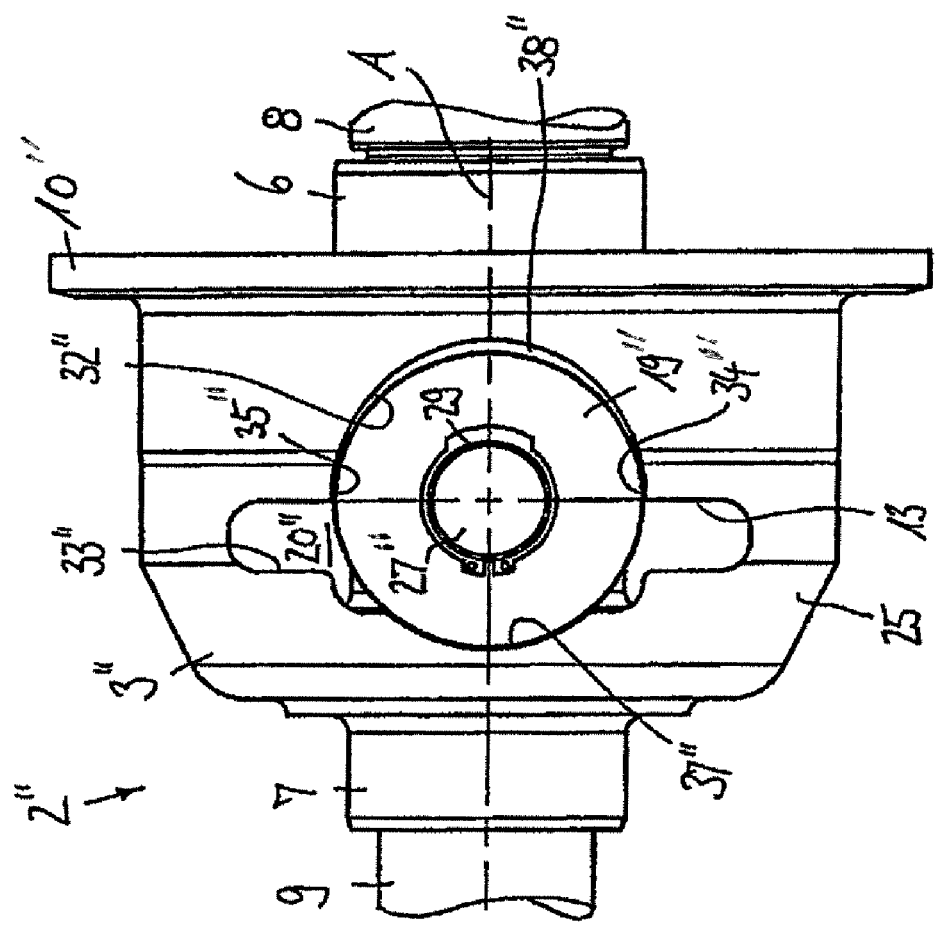

DIFFERENTIAL ASSEMBLY WITH BEARING DISCS IN OPENINGS FOR MOUNTING PURPOSES

TECHNICAL FIELD

The invention relates to a differential assembly which forms part of a differential drive and, more particularly, serves to be used in the driveline of a motor vehicle.

BACKGROUND

Differential assemblies commonly comprise a differential carrier which is rotatingly drivable around an axis of rotation, two sideshaft gears which are rotatably held in the differential carrier and serve to transmit torque to two sideshafts, as well as a plurality of differential gears which rotate together with the differential carrier and whose teeth engage those of the sideshaft gears.

From DE 198 54 215 A1 there is known a differential assembly with integrated constant velocity joints and a multi-part differential carrier. The differential carrier comprises a cylindrical carrier part which is closed after the set of gears has been mounted.

From DE 101 44 200 A1 there is known a differential assembly in the form of a crown gear differential. The differential carrier is provided in one part and is substantially cylindrical in shape. In its axial centre, the differential carrier comprises four uniformly circumferentially distributed openings for mounting the differential gears. Radially inwardly directed ribs are formed on to the webs between said openings and are connected to a journal element. The journals project into the four openings and, at their ends, comprise annular grooves which are engaged by axial securing rings for fixing the differential gears. The crown gears are inserted at the ends of the differential carrier and supported in the differential carrier by large axial securing rings.

U.S. Pat. No. 5,951,431 proposes a differential assembly in the form of a bevel gear differential with a one-part differential carrier. For mounting the set of gears, the differential carrier comprises two opposed assembly openings whose shape deviates from the circular shape and which are asymmetric with reference to a longitudinal central plane and a cross-sectional plane. Between the openings, in the circumferential direction, there are provided bores into which a journal part for supporting the two conical differential gears is inserted after the set of gears has been mounted.

In principle, one-part differential carriers require relatively large openings in the casing portion for mounting the sideshaft gears and the differential gears. Such openings reduce the stiffness of the differential carrier. Furthermore, the differential carrier is also weakened by the bores positioned between the assembly openings and provided for receiving the journals.

SUMMARY OF THE INVENTION

The present invention proposes a differential assembly having a high degree of strength and a rotational stiffness and has a compact design.

In accordance with the invention, a differential assembly is provided in the form of a crown gear assembly, more particularly for being used in the driveline of a motor vehicle. The differential assembly comprises a differential carrier which is produced in one piece, which is rotatingly drivable around an axis of rotation (A) and which, in a cylindrical portion, comprises two radial openings for mounting sideshaft gears and differential gears in the mounted condition, the sideshaft gears. In the differential carrier are rotatably held on the axis of rotation (A). The differential gears rotate jointly with the differential carrier around the axis of rotation and meshingly engage the sideshaft gears. Per opening, a bearing disc is inserted into the opening and includes a central bore in each of which there is held a journal end of a bearing journal for a differential gear.

In accordance with the invention, the objective is achieved by a differential assembly in the form of a crown gear assembly, more particularly for being used in the driveline of a motor vehicle, comprising a differential carrier which is produced in one piece, which is rotatingly drivable around an axis of rotation A and which, in a cylindrical portion, comprises two radial openings for mounting sideshaft gears and differential gears, wherein, in the mounted condition, the sideshaft gears in the differential carrier are rotatably held on the axis of rotation A and wherein the differential gears rotate jointly with the differential carrier around the axis of rotation and meshingly engage the sideshaft gears, and per opening, comprising a bearing disc inserted into said opening and having a central bore in each of which there is held a journal end of a bearing journal for a differential gear.

By arranging the bearing discs in the assembly openings, there is obtained a high degree of rotational stiffness and strength of the differential carrier because the bearing discs have a stiffening effect in the circumferential direction. There is a need for only two openings through which it is possible to insert both the differential gears and the sideshaft gears into the differential carrier. By providing the differential in the form of a crown gear differential, there is obtained a short axial length of the differential assembly with a relatively low weight. The two openings are preferably circumferentially offset relative to one another by 180°, wherein the differential carrier being designed in a through-aperture-free way in webs formed in the circumferential direction between the two openings. This applies to the use of preferably two differential gears and there is achieved a differential carrier with a particularly high degree of torsional stiffness.

According to one preferred embodiment, the bearing discs are held in a play-free way relative to the differential carrier, at least in the circumferential direction of the latter. There is thus ensured a play-free transmission of the torque introduced from the differential carrier to the bearing discs and the journal assembly connected thereto. Preferably, at each of the openings, the differential carrier comprises two supporting faces which are arranged opposite one another in the circumferential direction and with which the associated bearing disc is a contact in a play-free way in the mounted condition. In order to achieve a circumferentially directed introduction of force from the differential carrier into the bearing discs, the supporting faces are positioned on a cross-sectional plane through the journal axis or adjoin same. It is advantageous for the bearing disc to be in contact with the differential carrier in further points. For example, the shape of the opening relative to the bearing disc can be such that, in a radial view there is achieved a three-point contact or four-point contact around the circumference of the bearing disc. In a preferred embodiment, in the circumferential portions between the bearing disc and the opening, which circumferential portions are arranged between the contact points, there are formed gaps, so that the production tolerances can remain rough in these regions. This has an advantageous effect on the production costs. According to a preferred embodiment, the bearing discs are circular-disk-shaped, with other shapes not being excluded.

In order to avoid any undesirable out-of-balance, the two openings are preferably identical. Furthermore, the openings are preferably symmetrical with reference to the longitudinal central plane. The openings are asymmetric with reference to a cross-sectional plane arranged perpendicularly relative to the axis of rotation in order to minimize their surface area. The openings are preferably formed by two overlapping areas, of which a first area circumscribes a circle and of which a second area is greater than a radial projection of the sideshaft gears. In a radial view, the circle circumscribed by the first area corresponds approximately to the outer circumference of the bearing discs. The second area is preferably provided in the form of a slot extending in the circumferential direction. In respect of its shape, the slot approximately corresponds to the radial projection of the two sideshaft gears and is just large enough for the two sideshaft gears, while aligned in their respective operating positions, to be able to be threaded into the differential carrier. In a further embodiment, the differential carrier comprises an integrally formed-on flange for torque transmitting purposes, with the slot, with reference to the cross-sectional plane, being arranged so as to be remote from the flange. It is thereby ensured that the region of torque transmission of the differential carrier between the flange and the circumferentially positioned contact faces of the bearing disc is subject to a minimum amount of weakening only. In this way, there is achieved a particularly high degree of stiffness.

The journals of the journal assembly are inserted into the bores of the opposed bearing discs and axially fixed relative thereto, preferably by securing rings which engage annular grooves of the journals. According to a preferred embodiment with exactly two differential gears, the journal, in a central region, comprises flattened portions which can be engaged by sideshafts, which, for rotational safety purposes, can be drivingly connected to the sideshaft gears. In this way, the journal is prevented from rotating relative to the bearing discs.

Preferred embodiments of the inventive differential assembly will be described below with reference to the drawing figures.

BRIEF DESCRIPTION OF THE DRAWINGS

FIG. 5 shows an inventive differential assembly in a third embodiment in a radial view of the assembly opening.

DETAILED DESCRIPTION OF THE PREFERRED EMBODIMENTS

Figure 1:
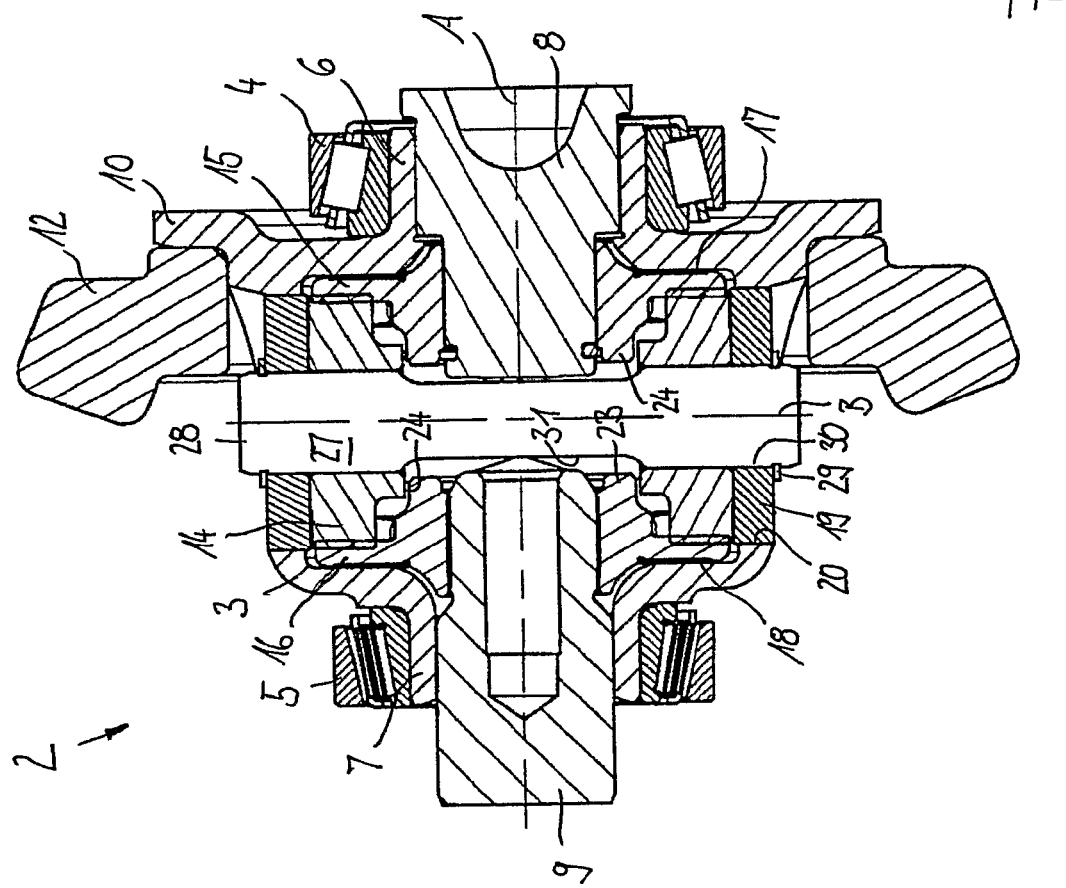
FIG. 1 is a longitudinal section of an inventive differential assembly in a first embodiment.
Figure 2:
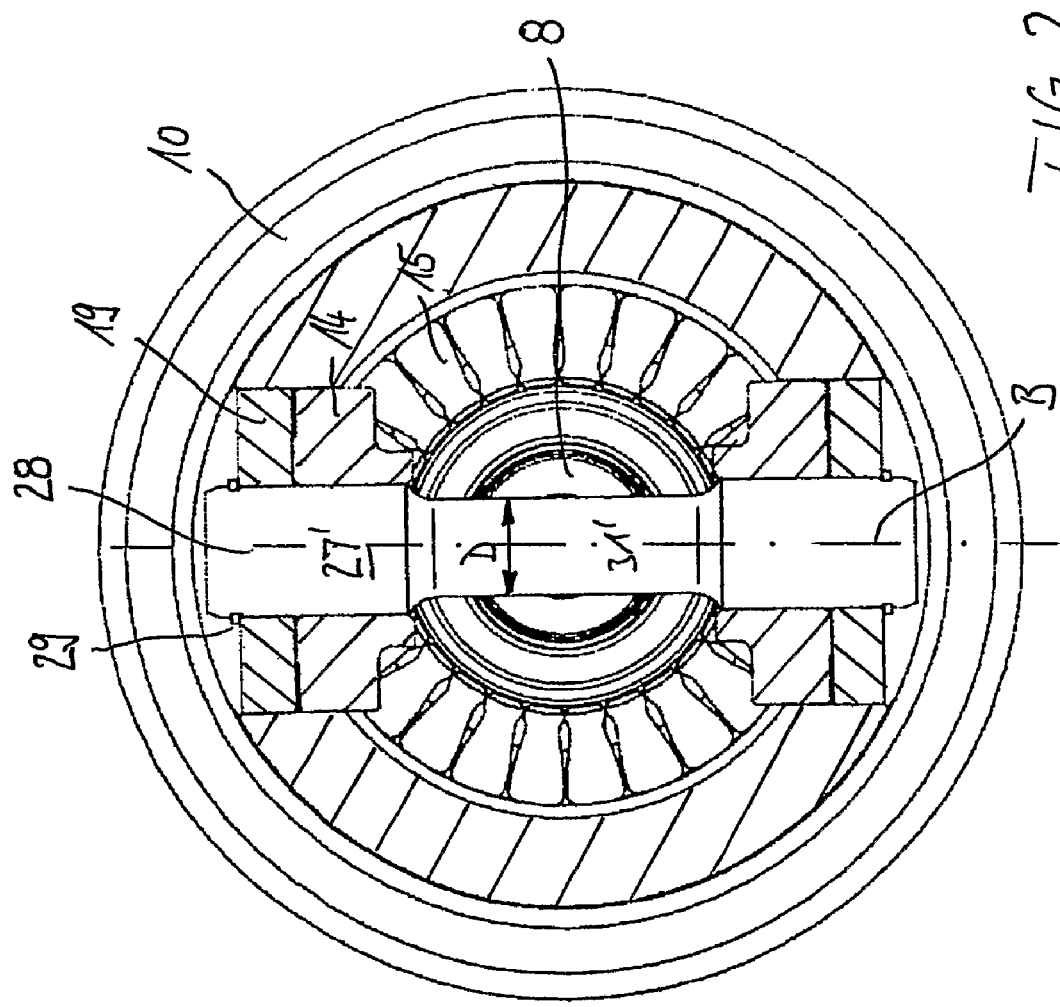
FIG. 2 shows the differential assembly of FIG. 1 in a cross-sectional view through the assembly opening with a modified journal.
Figure 3:
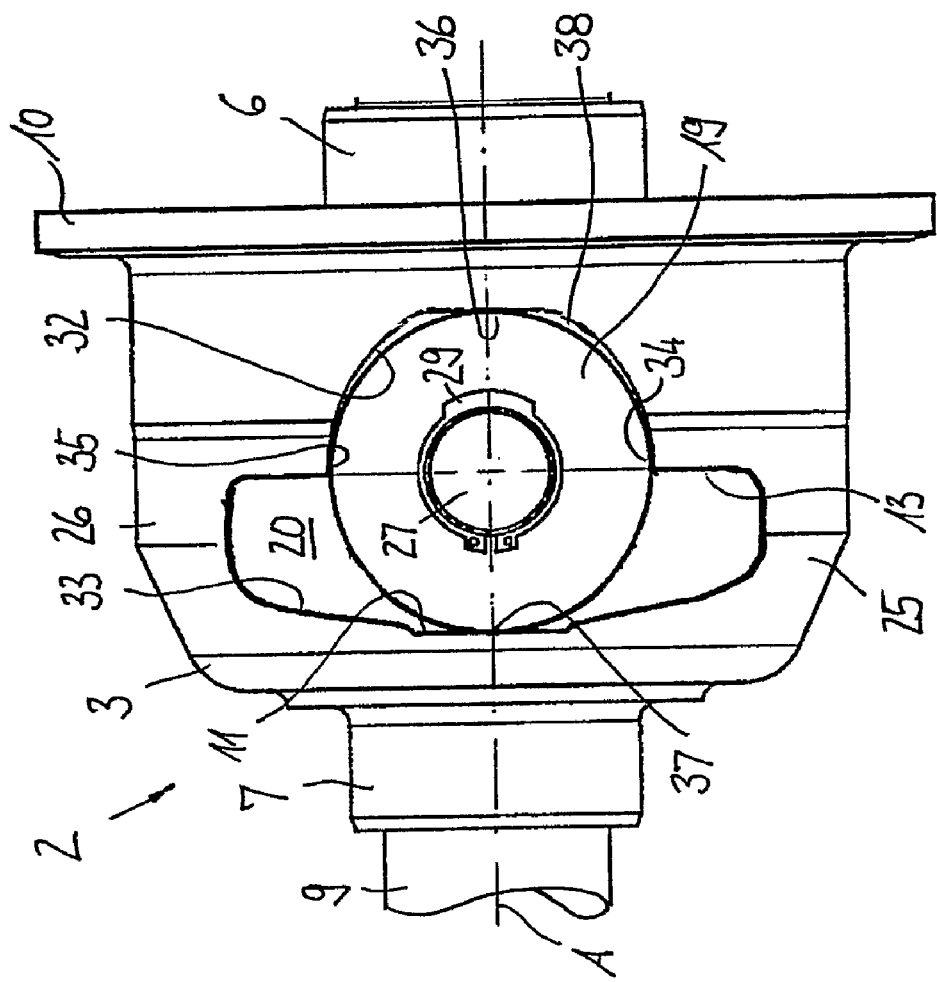
FIG. 3 shows the differential assembly of FIG. 1 in a radial view of the assembly opening.

FIGS. 1 to 3 will be described jointly below. They show a differential assembly 2 with a one-part differential carrier 3 which has to be supported in a stationary housing (not illustrated). For this purpose, there are provided two rolling contact bearings 4, 5 which receive two sleeve-shaped bearing projections 6, 7 of the differential carrier 3 which point in opposite directions. The differential carrier 3 is produced in one piece as a casting, so that it comprises a high degree of stiffness. The differential assembly 2 forms part of a differential drive in the driveline of a motor vehicle and serves to transmit torque from a propeller shaft (not shown) to two sideshafts 8, 9. The differential carrier is provided with a formed-on flange 10 to which there is secured a ring gear 12 for introducing the torque into the differential assembly 2. Via a plurality of differential gears 14 which are rotatably supported on a journal 27 and jointly rotate with the differential carrier 3, the introduced torque is transmitted to sideshaft gears 15, 16 engaging said differential gears 14. The sideshaft gears 15, 16 are axially supported relative to the differential carrier 3 commonly by friction reducing abutment discs 17, 18.

The differential assembly 2 is provided in the form of a crown gear differential, with the sideshaft gears 15, 16 being provided in the form of crown gears and the differential gears 14 in the form of spur gears. There is thus achieved a compact design and low weight. In the case of crown gear differentials, the crown gear teeth of the sideshaft gears 15, 16 are aligned radially towards the axis of rotation A, and the spur gear teeth of the differential gears 14 are aligned parallel to the journal axis B. As a result, the differential gears 14, in principle, can radially move on the journal axes B. When the differential assembly 2 rotates, the differential gears 14 are accelerated by centrifugal forces radially outwardly and abut the bearing discs 19 which are inserted into assembly openings 20 in a casing portion 25 of the differential carrier 3. In order to prevent the differential gears from moving radially inwardly towards the axis of rotation A at low speeds, the sideshaft gears 15, 16 have axial projections 22, 23 which are directed towards the journal axis B and which can be abutted by the differential gears 14 by corresponding abutment faces 24.

The two openings 20 are positioned diametrically opposite one another, comprise the same contour and are symmetrical with reference to the longitudinal central plane in order to avoid any undesirable out-of-balance. Each opening 20 is just large enough for inserting the sideshaft gears 15, 16 and the differential gears 14 into the differential carrier 3. The webs 26 formed in the circumferential direction between the openings 20 do not comprise a through-aperture. The circular-disc-shaped bearing discs 19 are arranged in the assembly openings 20 without any play, so that the torque introduced into the differential carrier 3 can be transmitted in a play-free way on to the bearing discs 19 and from there to the journal 27. The journal 27, by means of its journal ends 28, is inserted into respective bores 30 of the bearing discs 19 arranged opposite one another. In the journal ends 28, there are provided annular grooves which are engaged by a securing ring 29 each for securing the journal 27 relative to the bearing discs 19. In the case of the embodiment shown in FIG. 1, the journal 27, in a central portion, comprises lateral flattened portions 31 which can be engaged by the sideshafts 8, 9 connected in a rotationally fast way to the sideshaft gears 15, 16. In this way, the journal 27 is rotationally secured relative to the bearing discs 19. According to an alternative embodiment as shown in FIG. 2, the journal 27' is rotationally symmetric and comprises a central portion 31' with a circular cross-section whose diameter is reduced relative to the bearing portions. In this embodiment it would be necessary to provide different anti-rotation means.

It is particularly obvious from FIG. 3 that the openings 20 are formed by two overlapping areas of which a first area 32 circumscribes a circle and of which the second area 33 is greater than a radial projection of the sideshaft gears 15, 16. The circle circumscribed by the first area 32, in a radial view, approximately corresponds to the outer circumference of the bearing discs 19. The second area 33 is provided substantially in the form of a circumferentially extending slot which comprises a base 13 which extends parallel to the flange 10 and which is positioned in a cross-sectional plane formed by the journal axis B. The slot 33, in respect of shape, approximately corresponds to the radial projection of the two sideshaft gears 15, 16 and is just large enough to allow the two sideshaft gears 15, 16, aligned in their respective operating positions, to be threaded into the differential carrier 3. The transition regions between the base face 13 and a radial head face 11 of the slot 33 are formed by radii in order to avoid a notch effect and to achieve a high degree of stiffness.

The two areas 32, 33 are arranged in such a way that the opening 20 is formed entirely by the circular first face 32 in a region between a cross-sectional plane formed by the journal 27 and a flange 30 integrally formed on to the differential carrier 3. This means that the slot 33, with reference to the cross-sectional plane, is arranged away from the flange 30. The force transmission range between the flange and the contact points relative to the bearing disc 19 is thus subjected to minimum weakening only. The contact points are formed by two circumferentially opposed supporting faces 34, 35 against which the bearing disc 19 is supported. The torque is transmitted from the differential carrier to the bearing disc 19 via the supporting faces 34, 35 in the cross-sectional plane formed by the journal 19. It is thus advantageously ensured that the forces generated by the torque act in the circumferential direction only and do not comprise an axial force component. In the embodiment shown in FIG. 3, the bearing disc 19, in a radial view, is supported in a total of four points 34, 35, 36, 37 two of which are positioned opposite one another in the circumferential direction and two in the axial direction. The tolerances are selected to be such that in the contact points 34, 35, 36, 37 there exists a slight pressure fit between the bearing discs 19 and the differential carrier 3. In the partial circumferential portions between the contact points 34, 35, 36, 37, between the bearing disc 19 and the opening 20, there are formed gaps 38, so that the production tolerances can be kept rough in these regions.

Below, there will follow a description of the assembly sequence of the sideshaft gears 15, 16 and the differential gears 14 in the differential carrier 3. First, the sideshaft gear 15 adjoining the flange 10 is introduced into the opening 20 and axially displaced, until its radial contact face contacts the abutment disc 17. Thereafter, the sideshaft gear 16 being arranged at a distance from the flange 10 is introduced into the aperture 20 and, by means of its contact face, is made to contact the abutment disc 18. The sideshaft gears 15, 16 are introduced into the differential carrier 3 with their axes being aligned so as to extend approximately parallel to the axis of rotation A and without tilting laterally. Subsequently, the two differential gears 14, are introduced through the openings 20 into the differential carrier 3, with their respective axes being aligned so as to extend approximately perpendicularly relative to the axis of rotation and with their teeth being made to engage the teeth of the two sideshaft gears 15, 16. The next stage consists in inserting the bearing discs 19 into the openings 20. Then the journal 27 is inserted through the bores 30 of the bearing discs 19 and the differential gears 14 and is axially secured by the securing rings 29 relative to the bearing discs 19.

Figure 4:
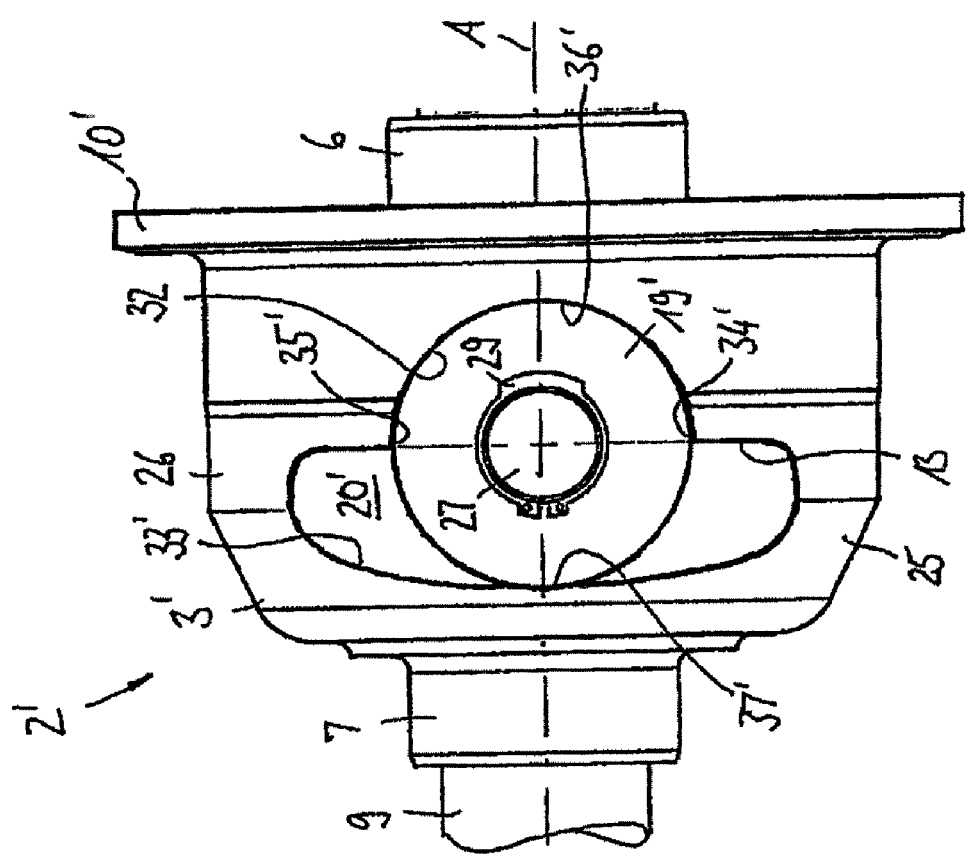
FIG. 4 shows an inventive differential assembly in a second embodiment in a radial view of the assembly.

FIG. 4 shows an alternative embodiment of an inventive differential assembly 2'. As far as design is concerned, it largely corresponds to that of FIGS. 1 to 3, which is the reason why reference is made to the above description. The opening 20' of the present differential assembly 2' has been modified relative to that shown in the above embodiment in that the first area 32' is formed by a semi-circle. The radius of said semi-circle corresponds to the radius of the bearing disc 19'. There is thus formed a surface contact 34', 35', 36' between the bearing disc 19 and the differential carrier 3' in the region between the cross-sectional plane and the flange 10', which leads to a higher degree of stiffness. The slot-like second area 33' of the opening 20', on its side removed from the flange 10', is formed by three radii and comprises a central supporting portion 37', with the radius of the central supporting portion 37' corresponding to the radius of the bearing disc 19', so that the latter rests in a planar way against the supporting portion 37'. In this embodiment, too, the tolerances have been selected to be such that the bearing disc 19 can be inserted with a slight interference fit into the respective opening 20'.

FIG. 5 shows a further embodiment of an inventive differential assembly 2" which, in respect of design, largely corresponds to that shown in FIGS. 1 to 3. To that extent, reference is made to the above description. In contrast to the above embodiments, the bearing disc 19" of the present differential assembly 2" is not supported relative to the differential carrier 3" in the region between the two supporting faces 34", 35". There is provided a sickle-like gap 38" between the bearing disc 19" and the differential carrier 3", so that, in this region, the production tolerances can be kept rough. The supporting faces 34", 35" which contact the bearing disc 19 in a plane through the journal axis B, which plane extends perpendicularly relative to the axis of rotation A, can be axis-parallel in a first region before they change into the adjoining concave region. The slot-like second area 33" of the opening 20", in a radial view, corresponds to a radial projection of the sideshaft gears 15 to the inserted at the flange end, with the transition regions being rounded off by radii. A supporting portion 37" axially removed from the flange 10 is formed by a radius which corresponds to the radius of the bearing disc 19. The bearing disc, in this region, thus rests against the supporting portion 37" in a planar way. In the axially opposite direction, i.e. towards the flange 10, the bearing disc 19" is directly supported against the differential carrier 3" via the journal 27", the differential gear 14 and the sideshaft gear 15 engaging the latter. The bearing disc 19" is thus axially held even without an additional axial contact point relative to the differential carrier 3". The tolerances in the contact regions 34", 35", 37" have been selected to be such that the bearing discs 19" are inserted into the respective opening 20" with a slight interference fit.

The invention claimed is:

1. A differential assembly in the form of a crown gear differential, comprising:

a differential carrier produced in one piece, said differential carrier rotatingly drivable around an axis of rotation (A), said differential carrier including a casing portion comprising two radial openings configured for inserting sideshaft gears and differential gears into the differential carrier, wherein said sideshaft gears are provided in the form of crown gears and said differential gears are provided in the form of spur gears;

wherein, in the mounted condition, said sideshaft gears in said differential carrier are rotatably held on said axis of rotation (A) and wherein the said differential gears are rotatably supported on a bearing journal and rotate jointly with said differential carrier around said axis of rotation (A) and meshingly engage said sideshaft gears;

wherein a bearing disc is inserted into each of said radial openings, said bearing disc having a central bore in which a journal end of said bearing journal is held;

wherein said radial openings are asymmetric with reference to a cross-sectional plane formed by the bearing journal and extending perpendicularly relative to the axis of rotation (A);

wherein said radial openings are symmetric relative to a longitudinal central plane which comprises the axis of rotation (A);

wherein at each of said radial openings, said differential carrier comprises two supporting faces which are arranged opposite one another in the circumferential direction and with which said associated bearing disc is in contact in a play-free way in the mounted condition; and wherein said two supporting faces are positioned on a plane which extends through a journal axis (B) and which is positioned perpendicularly relative to said longitudinal axis of rotation (A), or adjoins same.

2. The differential assembly according to claim 1, further comprising: webs formed in the circumferential direction between said two radial openings, such that said differential carrier is free from through-apertures.

3. The differential assembly according to claim 1, wherein said bearing discs are circular-disc-shaped.

4. The differential assembly according to claim 1, wherein said radial openings are formed by two areas overlapping one another, of which a first area circumscribes a circle and of which a second area is greater than a radial projection of said sideshaft gears.

5. The differential assembly according to claim 4, wherein said second area is provided in the shape of a slot extending in a circumferential direction.

6. The differential assembly according to claim 5, wherein said differential carrier comprises an integrally formed-on flange for the introduction of torque, wherein said slot, with reference to a cross-sectional plane comprising the journal axis (B), is arranged so as to be remote from said flange.

7. The differential assembly according to claim 1, wherein between said bearing disc and said radial opening, there is formed a gap extending over at least one partial circumferential portion of said bearing disc.

8. The differential assembly according to claim 1, wherein said radial openings are shaped in such a way that a three-point contact or a four-point contact is formed between a circumferential face of said bearing disc and said differential carrier.

9. The differential assembly according to claim 1, wherein there are provided exactly two differential gears which are supported on the journal ends of said journal, wherein said journal ends are inserted into bores of opposed bearing discs and are axially fixed relative thereto.

10. The differential assembly according to claim 1, wherein in a central region, said journal comprises flattened portions which, for anti-rotation purposes, can be engaged by sideshafts which, can be drivingly connected to the said sideshaft gears.

11. A differential assembly in the form of a crown gear differential, comprising:
a differential carrier produced in one piece, said differential carrier rotatingly drivable around an axis of rotation (A), said differential carrier including a casing portion comprising two radial openings configured for inserting sideshaft gears and differential gears into the differential carrier, wherein said sideshaft gears are provided in the form of crown gears and said differential gears are provided in the form of spur gears;
wherein, in the mounted condition, said sideshaft gears in said differential carrier are rotatably held on said axis of rotation (A) and wherein the said differential gears are rotatably supported on a bearing journal and rotate jointly with said differential carrier around said axis of rotation (A) and meshingly engage said sideshaft gears;
wherein a bearing disc is inserted into each of said radial openings, said bearing disc having a central bore in which a journal end of said bearing journal is held;
wherein said radial openings are asymmetric with reference to a cross-sectional plane formed by the bearing journal and extending perpendicularly relative to the axis of rotation (A);
wherein said radial openings are symmetric relative to a longitudinal central plane which comprises the axis of rotation (A); and
wherein said radial openings are shaped in such a way that a three-point contact or a four-point contact is formed between a circumferential face of said bearing disc and said differential carrier.

12. The differential assembly according to claim 11, wherein said bearing discs, at least in the circumferential direction of said differential carrier, are held in a play-free way relative to the said differential carrier.

13. The differential assembly according to claim 11 wherein, at each of said radial openings, the said differential carrier comprises two supporting faces which are arranged opposite one another in the circumferential direction and with which said associated bearing disc is in contact in a play-free way in the mounted condition.

14. The differential assembly according to claim 11, wherein there are provided exactly two differential gears which are supported on journal ends of said journal, wherein said journal ends are inserted into bores of opposed bearing discs and are axially fixed relative thereto.

15. The differential assembly according to claim 11, wherein said radial openings are formed by two areas overlapping one another, of which a first area circumscribes a circle and of which a second area is greater than a radial projection of said sideshaft gears.

16. The differential assembly according to claim 15, wherein said second area is provided in the shape of a slot extending in a circumferential direction.

17. A differential assembly comprising:
a differential carrier is produced in one piece, said differential carrier rotatingly drivable around an axis of rotation (A), said differential carrier including a casing portion comprising two radial openings configured for inserting sideshaft gears and differential gears into the differential carrier;
wherein, in the mounted condition, said sideshaft gears in said differential carrier are rotatably held on said axis of rotation (A) and wherein the said differential gears are rotatably supported on a bearing journal and rotate jointly with said differential carrier around said axis of rotation (A) and meshingly engage said sideshaft gears;
wherein a bearing disc is inserted into each of said radial openings, said bearing disc having a central bore in which a journal end of said bearing journal is held;
wherein said radial openings are asymmetric with reference to a cross-sectional plane formed by the bearing journal and extending perpendicularly relative to the axis of rotation (A);
wherein said radial openings are symmetric relative to a longitudinal central plane which comprises the axis of rotation (A);
wherein, at each of said radial openings, the said differential carrier comprises two supporting faces which are arranged opposite one another in the circumferential direction and with which said associated bearing disc is in contact in a play-free way in the mounted condition; and
wherein said two supporting faces are positioned on a plane which extends through a journal axis (B) and which is positioned perpendicularly relative to said longitudinal axis of rotation (A), or adjoins same.

18. A differential assembly comprising:
- a differential carrier is produced in one piece, said differential carrier rotatingly drivable around an axis of rotation (A), said differential carrier including a casing portion comprising two radial openings configured for inserting sideshaft gears and differential gears into the differential carrier;
- wherein, in the mounted condition, said sideshaft gears in said differential carrier are rotatably held on said axis of rotation (A) and wherein the said differential gears are rotatably supported on a bearing journal and rotate jointly with said differential carrier around said axis of rotation (A) and meshingly engage said sideshaft gears;
- wherein a bearing disc is inserted into each of said radial openings, said bearing disc having a central bore in which a journal end of said bearing journal is held;
- wherein said radial openings are asymmetric with reference to a cross-sectional plane formed by the bearing journal and extending perpendicularly relative to the axis of rotation (A);
- wherein said radial openings are symmetric relative to a longitudinal central plane which comprises the axis of rotation (A); and
- wherein said radial openings are shaped in such a way that a three-point contact or a four-point contact is formed between a circumferential face of said bearing disc and said differential carrier.

* * * * *